Figure 1:
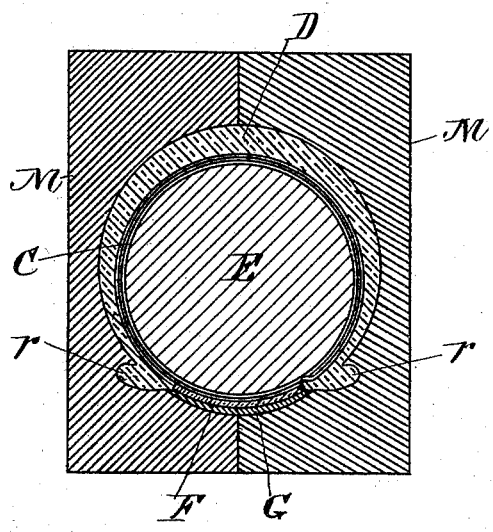

(No Model.)

W. B. HARDY.
PNEUMATIC TIRE.

No. 488,392. Patented Dec. 20, 1892.

WITNESSES.
Frank G. Parker.
John M. Benjamin.

INVENTOR
Walter B. Hardy
by N. H. Spencer
Atty

UNITED STATES PATENT OFFICE.

WALTER B. HARDY, OF BOSTON, MASSACHUSETTS, ASSIGNOR TO THE REVERE RUBBER COMPANY, OF SAME PLACE.

PNEUMATIC TIRE.

SPECIFICATION forming part of Letters Patent No. 488,392, dated December 20, 1892.

Application filed July 28, 1892. Serial No. 441,478. (No model.)

*To all whom it may concern:*

Be it known that I, WALTER B. HARDY, of Boston, in the county of Suffolk and State of Massachusetts, have invented certain new and useful Improvements in Pneumatic Tires, of which the following, taken in connection with the accompanying drawings, is a specification.

This invention relates to inflatable tires for bicycles and tricycles, the object being to so construct them as to lessen the danger of leakage of air and to facilitate repairs.

My invention is in the nature of an improvement upon that set forth in my application Serial No. 439,457, filed July 9, 1892; and it consists in a tire having an inflatable inner tube, and a wrapper suitably secured to the rim with flaps each side thereof adapted to be folded successively around the inner tube while in position on the wheel rim, such flaps thus forming, outside of the inner tube, a body or tread-portion made up of two thicknesses or flaps successively applied and secured,—the outer flap having longitudinal beads engaging with hooked inward-turned edges of the wheel rim. These flaps are of such breadth as to reach around the inner tube and to the opposite edges of the rim, and are made of vulcanized rubber lined or reinforced by firm flexible canvas. The rubber is vulcanized in a mold while the wrapper is bent around a core or form corresponding to the inflated inner tube, so that its normal tendency is to clasp the tube. The core or form is a continuous elastic body circular in cross section, or in two rigid semicircular parts, so that it may be removed when the flaps have been lifted or turned back. When the inflatable tube is substituted for the core the flaps are restored to position and secured in the manner shown in the drawings. Marginal beads formed along the edge of the wrapper and fitting into grooves at the inward-turned edges of the wheel-rim, hold the parts firmly when the tire is inflated. The mold is grooved to receive the rubber which forms these beads. I apply a much thicker body of rubber on the outer flap than on the inner, to constitute the tread surface of the tire, and I prefer to use, beneath the wrapper proper, an extra strip of rubber and canvas lying along the valley of the rim, to give special firmness to this base of the tire.

Figure 2:
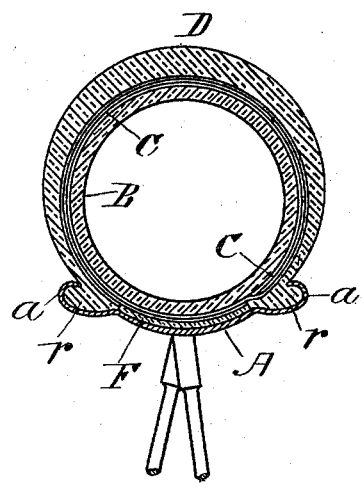

In the drawings, Figure 1 represents, in cross section, the mold, the core, and the rubber and canvas wrapper being vulcanized between them. Fig. 2 is a transverse section of the wheel-rim and tire complete.

A, Fig. 2, represents the wheel-rim having a suitable transverse curvature to receive in its sunken periphery my improved tire.

B is the inflatable inner tube, made of vulcanized rubber in any approved form, either a plain tubular ring or one of the so-called "non-puncturable" tubes in which the outermost portion, nearest to the tread, is held under compression, so that any small perforations made therein will be closed by the internal pressure.

C D is the wrapper to which my invention more particularly relates, C being the innermost flap or fold, formed of canvas coated with rubber on its outer surface, and D the much heavier outer flap or fold, made of a continuation of the same canvas with a thick body of rubber secured thereon by vulcanization. I furnish an extra strip, F, of rubber and canvas beneath the wrapper proper and lying along the valley of the rim, to give additional body to this portion of the wrapper. This wrapper is secured to the concave rim A in a firm manner, either by vulcanizing or cementing it along its longitudinal center to the concave face of the rim, or by riveting it thereto, or by such other means as may be preferred. The vulcanizing to the wheel rim may be readily effected by first coppering the face of the rim, then applying thereto the rubber face of the parts C or F while in the raw state, then pressing this central part of the wrapper to the rim by the curved core E, then wrapping the flaps C D successively around the core, and inclosing the whole in the circular mold M, and subjecting the rubber to the vulcanizing process.

I prefer to form the wrapper, as illustrated in Fig. 1, not upon the wheel rim, but on a concave ring G, having the same diameter and transverse curvature as the body of the wheel-rim, upon which the tire is to be used. This ring G fits into a recess formed in the mold M to receive it, and the wrapper is supported during its construction by the ring and the internal core E. The rubber is prevented from adhering to the concave ring G by the use of powdered talc as is well known to rubber workers. The flaps of the tire are similarly prevented from adhering together during vulcanization. The mold is in two parts, each grooved circularly to receive between them the wrapper inclosing the core and mounted in the ring G; and when they are placed in the heater for a sufficient length of time the rubber is properly vulcanized. The vulcanizing of the rubber while the wrapper is wrapped around the core and confined by the mold, fixes its normal position to coincide with that which it occupies when in use, or in other words gives it a permanent tendency to retain the same form in cross section which it had when vulcanized. Hence the flaps will tend to embrace the inner tube, and a moderate force will hold them in place, after said tube has been introduced in place of the core E around which the wrapper was formed. In removing the core the edges of the flaps will be loosened from the rubber beneath them, and they will be turned back enough to release the core and insert the deflated tube; then the tube may be wholly or partially inflated and the flaps wrapped around and secured to it.

The drawings represent the means I have devised for securing the edges of the wrapper to the wheel-rim. The edges $a$ of the rim are hooked or turned inwardly as in Fig. 2, and ribs or beads $r$ are formed in the rubber of the wrapper to fit into the marginal grooves of the rim. One of these ribs or beads will be along the extreme edge of the outer flap, and the other at a line opposite thereto, about over the edge of the inner flap. Each half of the mold is grooved to receive the rubber which forms these ribs or beads, as seen in Fig. 1. When the tire is deflated the ribs or beads may be readily introduced into and removed from the marginal grooves $a$ of the rim; but when inflated they are firmly held, and the firmness of the hold increases with the pressure.

It will be observed, as a peculiarity of this tire that it does not need to be removed from the wheel-rim in case of injury to the inner tube, since it is practicable to open up the wrapper and repair the inner tube when occasion requires, and then to replace the folds of the wrapper and engage its beads $r$ in the groove $a$—without having, in any degree, loosened its hold upon the wheel-rim. The great advantage of a construction which permits this is obvious.

I claim as my invention.

The concave rim A having inward-turned edges $a$ constituting marginal grooves, in combination with an inflatable inner tube and with the wrapper C D permanently secured along its longitudinal center to the rim, and having ribs or beads $r$ fitting into said grooves, substantially as and for the purpose set forth.

In testimony whereof I have signed my name to this specification, in the presence of two subscribing witnesses, on this 21st day of July, A. D. 1892.

WALTER B. HARDY.

Witnesses:
A. H. SPENCER,
W. H. GLEASON.